Nov. 13, 1934.   R. M. FENTON   1,980,261
SHEET INSPECTION TABLE
Filed June 23, 1931   3 Sheets-Sheet 1

INVENTOR.
Ray M. Fenton.
BY
Fay, Oberlin & Fay
ATTORNEYS

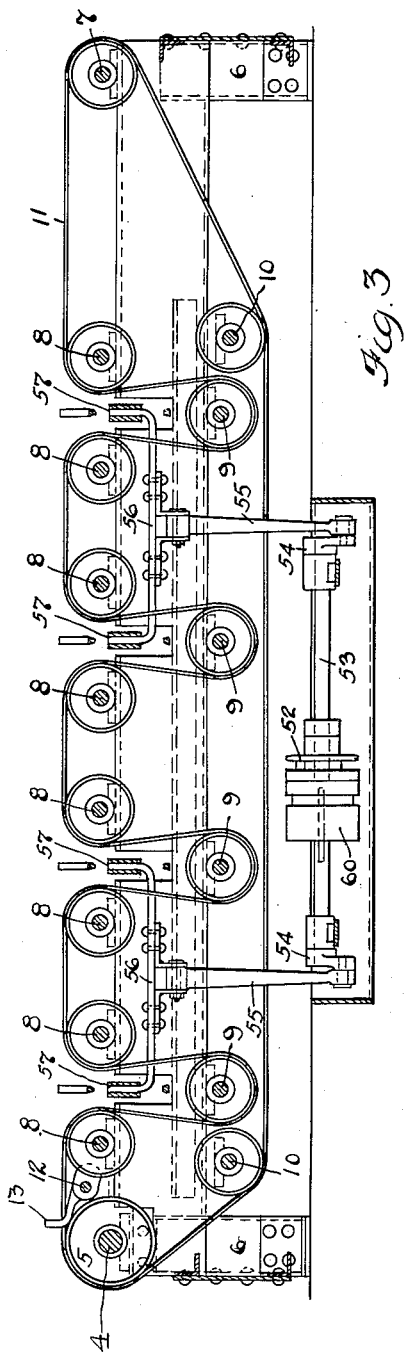

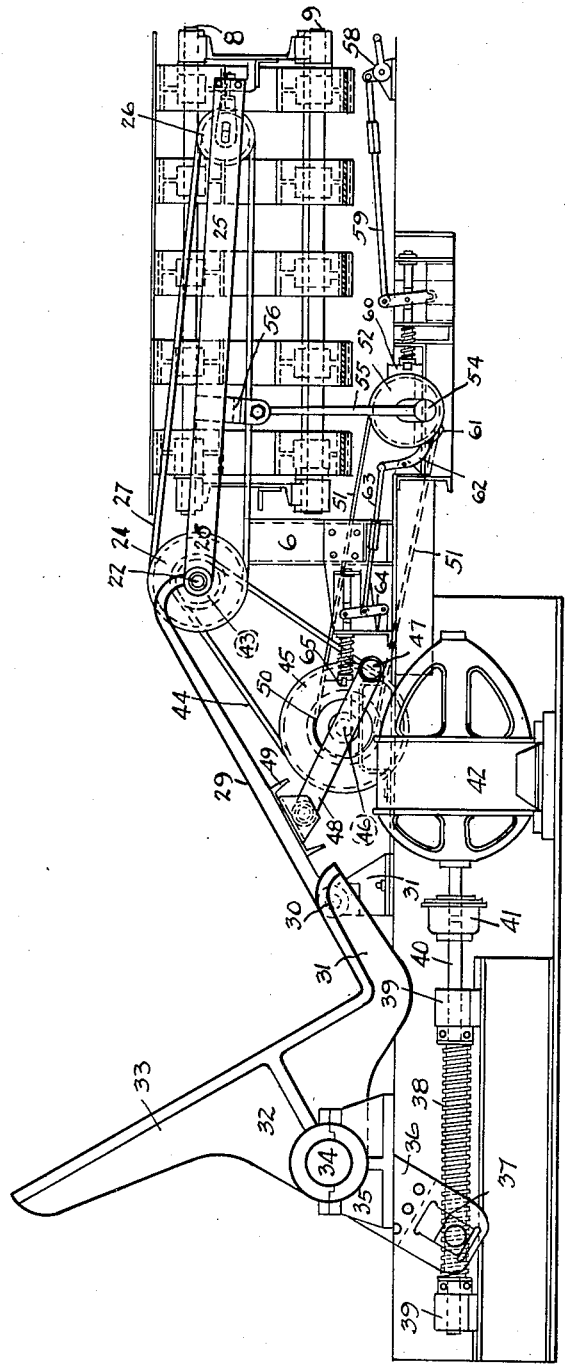

Patented Nov. 13, 1934

1,980,261

UNITED STATES PATENT OFFICE 1,980,261

SHEET INSPECTION TABLE

Ray M. Fenton, Youngstown, Ohio, assignor to Newton Steel Company, Youngstown, Ohio, a corporation of Ohio Application June 23, 1931, Serial No. 546,364

14 Claims. (Cl. 80—44)

My invention relates to transfer tables, receiving sheets from the finishing pass of a rolling mill, so arranged that the sheets may be held until inspected under a strong light; and with means to quickly transfer selected sheets from the forward movement of material. To this end, in this exemplification, I provide a transfer table with conveyor belts moving longitudinally thereof, the movements of which belts are interrupted at intervals uniformly. In the interruptions, other conveyor belts move transversely and are so positioned that they are normally below the level of the longitudinal belts, but may be raised above same when a sheet is selected for diverting. These transverse belts convey selected sheets onto arms which are so hinged that they may be made to tilt the selected sheet onto a piling cradle. The means provided and the mode of operation will clearly appear from the attached drawings and the description herein given.

In the annexed drawings:

Fig. 2 is a plan view showing the position of my apparatus in relation to finishing rolls, leveling rolls, and sheet oiler;

Figure 1:
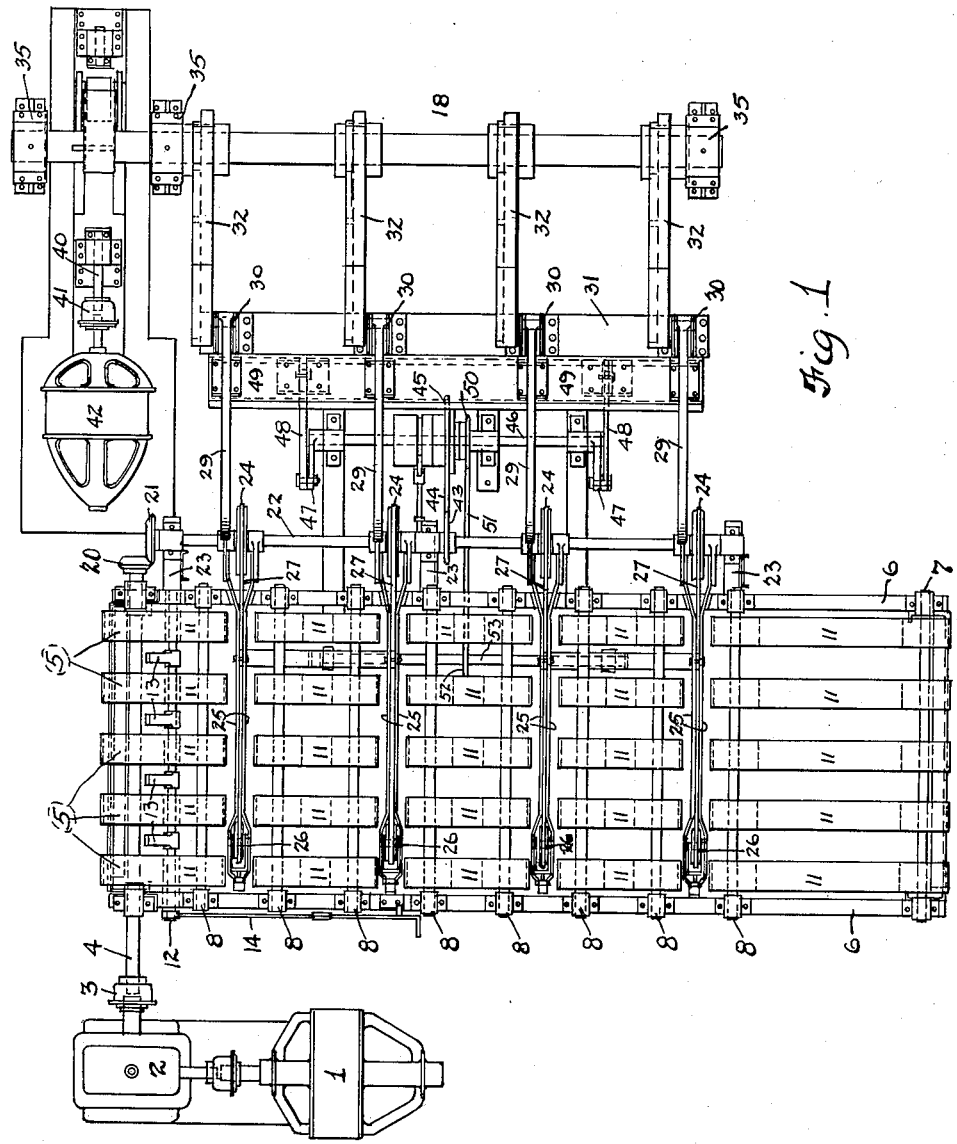
Fig. 1 is a general diagram of the table with its conveyor, cross conveyor, the tilting arms, and the piling cradle.

Fig. 3 is a cross-sectional longitudinal view of the table showing the relation of transfer belt and pulleys to provide interruption in the movement of the former on the surface of the table, and also showing a view of the mechanism for raising and lowering the transverse belts; and Fig. 4 is a cross-sectional transverse view of the table, tilting arms, and piling cradle showing the mechanism by which they are operated and also the mechanism by which the transverse belts are raised and lowered.

Referring to the drawings, a motor 1 through reduction gears 2 provides the power for operating the conveyor belts and the tilting arms. The gears 2, through a universal joint 3, drive a shaft 4, upon which are spaced fixed pulleys 5. The shaft 4 is journaled on a frame 6, at the other end of which is a similar shaft 7 carrying similarly arranged pulleys. Between said shafts 4 and 7, spaced along the upper side of frame 6, are four pairs of shafts 8 each carrying pulleys corresponding to those on shafts 4 and 7. Between the shafts of each such pair, and below same, borne on the lower portion of frame 6, are shafts 9 with pulleys corresponding with those on shafts 4, 7 and 8. Also carried by the lower portion of frame 6 toward the extreme ends thereof and lower than shafts 9 are shafts 10 carrying pulleys corresponding to those on other shafts. As shown in Fig. 3, conveyor belts 11 are passed about the corresponding pulleys on the several shafts enumerated.

Near the exit end of the transfer table, carried on a shaft 12 in fixed relation thereto, are stops 13 in the form of flat hooks. The shaft 12 is journaled in the frame 6 and, through a short lever extending from the end of such shaft 12, is so connected to rod 14 that the flat hooks 13 may be raised to intercept and hold a sheet or may be depressed to permit a sheet to pass off the table,—as may be seen from Fig. 2, wherein sheets from the finishing stand of rolls 15 pass to and through the leveling rolls 16, onto the table 17 and, if not selected for transfer to piling cradle 18, are passed on to the oiler 19.

The shaft 4, through which the motor 1 supplies power for the longitudinal transfer belts, carries keyed to its rear end a bevel gear 20 engaging bevel gear 21 which drives a shaft 22 parallel to frame 6 and journaled upon rearward extensions 23 carried thereon. Carried upon said shaft 22 in fixed relation thereto are pulleys 24 which, with the shaft, are so positioned that the top of each pulley is level with, or slightly above, the level of the belts 11. Affixed to the hub of each pulley 24, one on either side of the pulley, are arms 25 extending to the front side of the transfer table and located in the spaces left between pulleys mounted on shafts 8 by running the belts 11 down around pulleys mounted on shaft 9, said spaces being immediately above said pulleys mounted on shaft 9. These pairs of arms 25 are united and spaced apart at their far ends by short shafts, upon which are mounted revolving pulleys 26. Rotating about each pulley 24 and the pulley 26, carried by the pairs of arms 25 affixed to the hub of the respective pulley 24, is a belt or rope 27.

Located behind the transfer table 17 is a discharge mechanism 28 as appears in Fig. 2 and is best seen in detail in Figs. 1 and 4. This mechanism comprises arms 29 pivoted at 30 to a base 31 parallel to the transfer table, with the free end of each arm curved downward to rest upon the hub of a pulley 24 so that the upper faces of the arms define a plane in practically declined continuation of the plane defined by the upper surfaces of the belts 27 carried on the pulleys 24. As stated, the upper faces of the arms 29 are inclined, and this inclination is such by reason of the position of pivots 30, that the plane defined by said faces is continued in the plane defined by the upper faces of the short arms 31 of the piling cradle 18.

The piling cradle 18 is located immediately back of the discharge mechanism 28 and is so positioned, as stated, that the plane defined by the upper surfaces of the short arms of the piling cradle is a continuation of the flat plane defined by the upper surfaces of the discharge arms. The piling cradle comprises a plurality of L shaped members 32 with long arms 33 and short arms 31 positioned when tilted as stated. These L shaped members are mounted on a shaft 34 in fixed uniform relation thereto. Said shaft 34 is parallel to the transfer table and is journaled in bearings 35. Extending downwardly from the shaft 34 near one end thereof are two short fixed arms 36 between which is mounted a steel block 37 in rotatable and slidable relation thereto, which block is pierced with a threaded hole engaging the screw 38 rotating on fixed bearings 39. This screw is connected to, and is driven by, a shaft 40 connected by a universal joint 41 with a motor 42.

Keyed to the shaft 22 intermediate thereof is a pulley 43 which, by a belt 44, drives a pulley 45 rotatable on a shaft 46 which shaft is carried on bearings on foundations located beneath the discharge arm 29 and terminates at either end in a crank 47 which is connected by the rods 48 through pivoted connections with a channel member 49, which channel member is affixed to the several discharge arms 29 near their pivoted ends.

Rotatably carried by the shaft 46 and affixed to the pulley 45 is a pulley 50 which, through a belt 51, drives a pulley 52, rotatably mounted on a shaft 53 rotatable in bearings on foundations in a pit below the transfer table and parallel therewith. The shaft 53 terminates at either end in a crank 54, each of which cranks carries pivoted thereto a rod 55 pivotally connected to the middle point of a member 56 shaped like a wide shallow U. To the end 57 of each arm of each U-shaped member is rigidly affixed a pair of long arms 25 which support the transverse belts.

Located at the feet of the operator under the front edge of the transfer table is a trip 58 which, when thrown, acts through the rod 59 and causes a clutch 60, slidably keyed to shaft 53 beside the rotatable pulley 52, to engage said pulley for one complete turn thereof. Carried on the periphery of said clutch 60 is a cam 61, which, as the revolution is completed, comes into engagement with and throws a lever 62 mounted immediately behind the clutch 60. Said lever 62, through the rod 63, is connected with a lever 64 which operates a clutch 65 slidably keyed to the shaft 46 beside the rotatable pulley 45. When actuated by the rod 63 the clutch 65 engages the pulley 45 and makes one complete revolution. The clutches 60 and 65 may be of the automatic self-disengaging type, as illustrated and set forth in Vol. II of "Machinery's Encyclopedia", page 137 et seq.

In operation a sheet from the leveling rolls 16 is fed upon the transfer table 17 which has suitably located thereabove a powerful light; the stops 13 are up and hold the sheet as the longitudinal conveyor belts carry it forward; the operator standing in front of the table completes his inspection and at his election the stops are lowered and the sheet passes on to the oiler; or the operator steps on trip 58 and the clutch 60 slidably keyed on the shaft 53 engages the rotating pulley 52 and makes with its shaft a complete revolution during which the rods 55 are thrust upward, lifting the arms 25, which carry the transverse belts 27, until the latter engage the sheet and throw it onto the discharge arms 29. As the clutch 60 completes a revolution the cam 61, borne on the periphery thereof, actuates the clutch 65 which engages the rotating pulley 45 and makes a complete revolution. Clutch 65 being slidably keyed on shaft 46, the latter rotates and the cranks on the end thereof, through rods 48, lift the arms 29 about their pivots 30 and tilt the sheet onto the face of the long arms 33 of the piling cradle.

When a desired quantity of selected sheets have been piled in the cradle 18, the motor 42 actuates the screw 38 and the long arms 33 of the piling cradle are brought thereby to a level position to facilitate the handling of the piled sheets.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a transfer table for steel sheets, in combination, a belt travelling longitudinally thereof so arranged as to have spaced contact relation with a sheet thereupon, a belt travelling transversely of the table and located below the surface of the table in the spaces between areas of said contact relation, and controlled means to lift said transverse belts into contact relation with said sheet.

2. In a transfer table for steel sheets, in combination, a belt travelling longitudinally thereof so arranged as to have spaced contact relation with a sheet thereupon, a belt travelling transversely of the table and located below the surface of the table in the spaces between areas of said contact relation, controlled means to lift said transverse belts into contact relation with said sheet, and mechanism controlled by said lifting means for piling such sheet.

3. In a transfer table for steel sheets, in combination, mechanism which advances a sheet, means to hold a sheet for a desired period, controlled mechanism adapted to selectively permit such sheet to continue its regular line of advance or to divert such sheet from said regular line of advance, and mechanism controlled by said diverting mechanism for piling such diverted sheets.

4. In a transfer table for steel sheets, in combination, a belt travelling longitudinally thereof so arranged as to have spaced contact relation with a sheet thereupon, a belt travelling transversely of the table and located below the surface of the table in the spaces between areas of said contact relation, controlled means to lift said transverse belts into contact relation with said sheet, and means to hold a sheet for a desired period.

5. In a transfer table for steel sheets, in combination, mechanism to divert a sheet from the regular path of progression thereupon, pivoted arms to receive such diverted sheet, actuating means to cause said arms to deposit said sheet on a pile, and means interlocking said actuating means and said diverting means, so that use of the latter will operate the former.

6. In combination, pivoted arms adapted to receive sheets, means to move said arms through an angle and pile said sheets, a pivoted cradle to receive said piled sheets, said cradle having arms normal to each other and a pivot at the intersection of said arms and means to rotate said cradle through such an angle that the side of the sheet which was up as received by the arms is down as it lays in the pile.

7. A mechanism for piling sheets selected from a transfer table, which mechanism comprises a member to receive such sheets when diverted from said table, a rotatably mounted shaft having a crank integral therewith, a rod connecting said crank to said member, a clutch mounted on said shaft, in non-rotatable relation thereto, beside a revolving pulley also mounted thereon, and means whereby operation of the diverting means causes said clutch to engage the said pulley for one revolution thereof.

8. A mechanism for piling sheets selected from a transfer table, which mechanism comprises a member to receive such sheets when diverted from said table, a clutch non-rotatably mounted on a shaft beside a revolving pulley, means whereby the clutch is caused to engage said pulley when a sheet is diverted from the table, and means so connecting said clutch with said member receiving a sheet that in revolving the clutch causes the member to transfer said sheet to a pile.

9. In a transfer table for steel sheets, the combination of a frame, an endless belt-conveying means disposed longitudinally of said frame, another endless belt-conveying means disposed transversely of and in non-interfering spaced relationship with said first-named conveying means, and control means for intermittently moving said transverse conveying means into sheet-contacting position.

10. In a transfer table for steel sheets, in combination, a frame, conveying means mounted thereon including an endless belt disposed longitudinally of said frame with sheet bearing surfaces in spaced relation, other conveying means mounted transversely of said frame including an endless belt located between the spaced bearing surfaces of said longitudinal belt, and means adapted to raise the bearing surface of said transverse belt above the spaced bearing surfaces of said longitudinal belt and to depress it therebelow.

11. In a transfer table for steel sheets, in combination, mechanism to divert a sheet from the regular path of progression thereon, pivoted means adapted to receive such diverted sheet and deposit it on a pile, actuating means adapted to move said pivoted means through an angle, a pivoted cradle comprising a horizontal member and a vertical member adapted to receive sheets from said pivoted means and hold same in a vertical pile standing on said horizontal member, and means adapted to rotate said cradle about a pivot located at the intersection of said arms until said vertical arm is horizontal.

12. In a transfer table for steel sheets, in combination, mechanism adapted selectively to divert a sheet from the regular path of progression thereupon, pivoted arms to receive such diverted sheets, means to rotate said arms, a pivoted member having a vertical arm and a horizontal arm in fixed relation at right angles adapted to receive a vertical pile of diverted sheets, and means adapted to lower said vertical arm to a horizontal position.

13. In a transfer table for steel sheets, in combination, mechanism adapted selectively to divert a sheet from the regular path of progression thereupon, pivoted arms to receive such diverted sheet, actuating means to cause said arms to deposit said sheet on a pile, a pivoted cradle having two arms normal to each other, said cradle being adapted to receive said sheets in a vertical pile, a pivot upon which said cradle is mounted located at the intersection of said arms, and means to rotate said cradle through an angle of 90°.

14. In a transfer table for steel sheets, in combination, a frame, conveying means mounted thereon including an endless conveyor disposed with sheet bearing surfaces in spaced relation, other conveying means mounted transversely of said first-named means and including an endless conveyor located between the spaced bearing surfaces of said first-named conveyor and having a bearing surface in the plane thereof, and means adapted to move the bearing surfaces of said conveyors relatively until in different planes.

RAY M. FENTON.